Oct. 5, 1965 D. DANIELS 3,209,786
FLUID COUPLING WITH VARIABLE FLOW RESTRICTING MEANS
Filed April 26, 1962
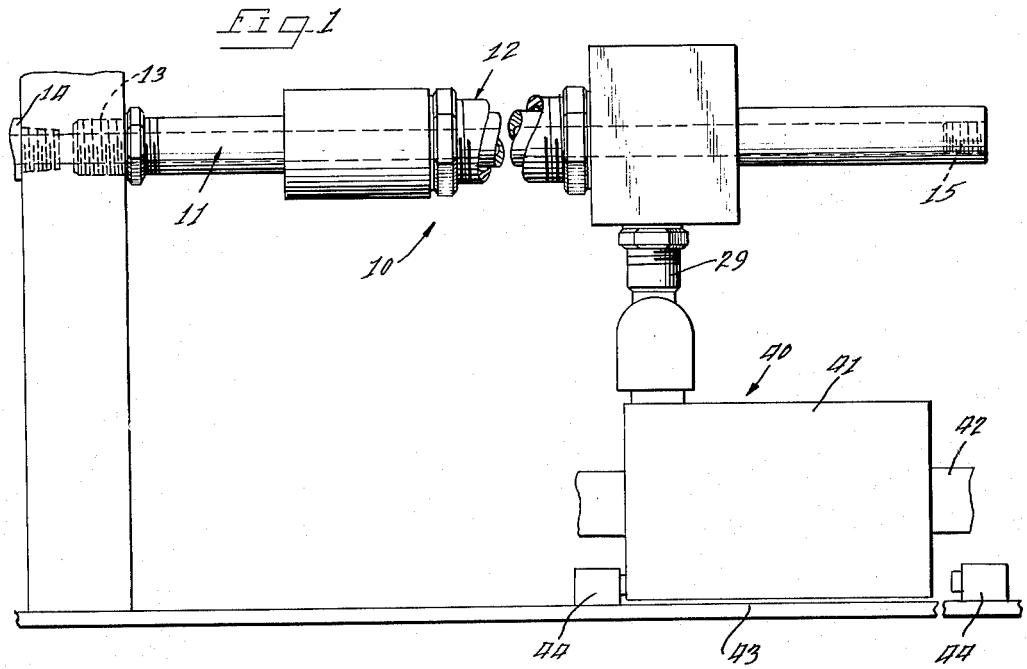
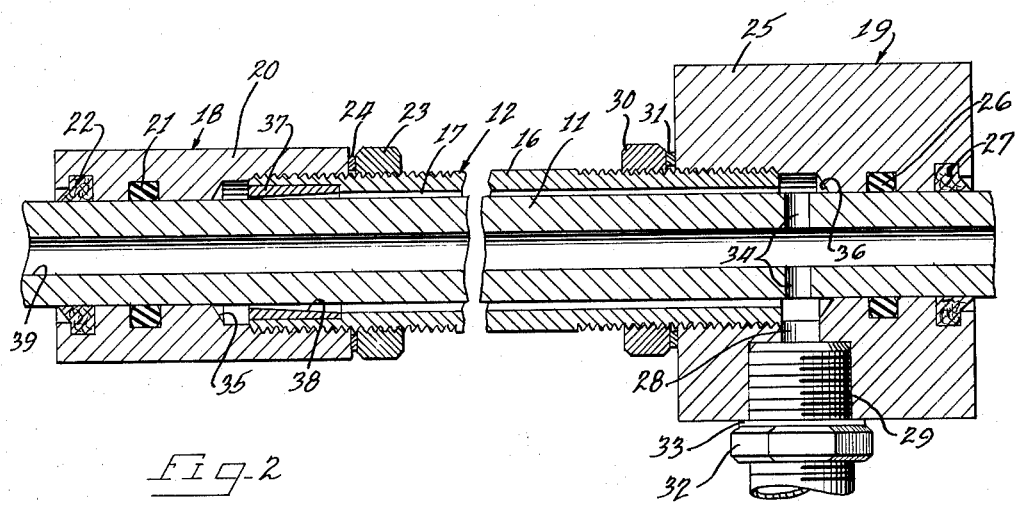
INVENTOR.
Dennis Daniels
BY
ATTORNEYS

United States Patent Office 3,209,786
Patented Oct. 5, 1965

3,209,786
FLUID COUPLING WITH VARIABLE FLOW RESTRICTING MEANS
Dennis Daniels, Williamsville, N.Y., assignor to Houdaille Industries, Inc., Buffalo, N.Y., a corporation of Michigan
Filed Apr. 26, 1962, Ser. No. 190,433
1 Claim. (Cl. 138—43)

This invention relates generally to fluid couplings, and more specifically to a telescopic or sliding fluid coupling.

Although the principles of the present invention may be included in various devices, a particularly useful application is made in a fluid coupling which is adapted to be connected between two relatively movable components. In particular, when a fluid-operated component is to be movably or translatably supported, it has been common heretofore to employ a flexible hose or hoses to connect such component to the fluid system. Under certain conditions, it is impracticable to use a hose. These include conditions where the ambient temperature is too extreme for a hose, where a hose would be subjected to abrading to an excessive extent, and the like.

The present invention contemplates the utilization of major components which are entirely rigid and with which known high temperature and low temperature seals may be employed for adapting the same to extreme ambient temperature conditions. Further, the device can be arranged so that there is no engagement between it and other elements that happen to be in the proximity.

Accordingly, it is an object of the present invention to provide an improved fluid coupling.

A still further object of the present invention is to provide a slidable fluid coupling which will throttle flow at a selected point along the travel.

Many other advantages, features and additional objects of the present invention will become manifest to those versed in the art upon making reference to the detailed description and the accompanying sheet of drawings in which a preferred structural embodiment incorporating the principles of the present invention is shown by way of illustrative example.

On the drawings:

FIGURE 1 is a an elevational view of a fluid coupling provided in accordance with the principles of the present invention, the same being illustrated as being connected to relatively movable components; and FIGURE 2 is an enlarged fragmentary cross-sectional view of the fluid coupling of FIGURE 1.

As shown on the drawings:

The principles of this invention are particularly useful when embodied in a fluid coupling assembly such as illustrated in FIGURE 1, generally indicated by the numeral 10. The fluid coupling 10 includes an inner elongated tubular member 11, which is the longer member, and a shorter outer elongated tubular member 12.

The tubular member 11 is threaded at one end 13 for connection into a fluid circuit fragmentarily illustrated at 14, and here comprising a rigid element. The tubular member 11 may similarly be adapted and connected at its other end, if desired, but is here illustrated as being closed by means of a plug 15.

As best seen in FIGURE 2, the outer elongated tubular member 12 includes a pipe-like portion 16 threaded at both ends and extending about the inner tubular member 11 in radially spaced relation to the outer surface thereof, and defining an elongated annular passage 17 therebetween. At each end of the pipe-like member 16, there is provided a slidable fluid-tight telescopic connection 18, 19.

The connection 18 includes a block or housing 20 slidably supported directly on the outer surface of the inner tubular member 11, and having an O-ring 21 forming a fluid-tight seal therewith. Preferably, these is also included a wiper 22 which is disposed axially outwardly of the O-ring 21, which wiper serves to keep the outer surface of the tubular member 11 clean, thereby minimizing the risk of damage to the O-ring 21 from dirt. The pipe-like portion 16 is secured by its threads, which may be fluid-tight pipe threads, to the housing 20, the thread connection being locked by a jamb nut 23 and washer 24. In like manner, the other end of the pipe-like member 16 is threadably sealably connected to the fluid-tight connection 19 which includes a housing 25 having an O-ring 26 and a wiper 27. It is evident that the O-ring 26 and the wiper 27 are structurally and functionally similar to the O-ring 21 and the wiper 22. Further, the housing 25 has a radial aperture 28 which fluidly communicates with the annular passage 17 at one end, and with a suitable pipe fitting 29 at the other end. A jamb nut 30 and washer 31 are provided which correspond to the nut 23 and washer 24, and a further jamb nut 32 and washer 33 serve to hold the fitting 29 securely and tightly on the housing 25.

Means are provided to define a path of fluid communication between the interior of the inner tubular member 11 and the annular passage 17. To this end, the tubular member 11 is provided with a pair of radially directed apertures 34, 34 each defined by portions of the wall of the inner member 11. The ends of the annular passage 17 are respectively defined by a surface 35 in the housing 20, and a surface 36 in the housing 25. The surfaces 35 and 36 are of identical effective size so that when a pressure is present in the annular passage 17, axially directed forces are balanced so that the fluid pressure does not tend to create an axial movement between the outer member 12 and the inner member 11.

This device further particularly lends itself to further serve as a throttling means for a portion of the relative travel between the outer member 12 and the inner member 11. To this end, there is provided an annular or tubular insert 37 at one end of the outer pipe-like member 16, the insert 37 having a gradually tapered inner surface 38 larger than the outside diameter of the inner member 11, having an axial length somewhat greater than the diameter of the apertures 34, and which may be moved to register progressively with the apertures 34. In an ideally designed unit, the inner surface 39 or inside diameter of the inner member 11 will comprise the smallest effective flow area through the device. However, when a tapered portion is provided, such as the insert 37, it is necessary that the minimum effective annular flow area be less than the effective flow area defined by the surface 39. It is to be understood that the location and exact nature of the taper of the insert 37 shown in FIGURE 2 is illustrative and not limiting.

As seen in FIGURE 1, the fitting 29 communicates fluidly with a fluid-operated element 40 of any type. The elment 40 here illustrated comprises a linear fluid actuator of the spring-return type wherein neither the cylinder 41 nor its rod 42 is rigidly supoprted, but wherein the cylinder 41 is slidably supported such as on or adjacent to a support surface 43.

To insure that the outer member 12 does not reciprocate axially too far so as to expose the apertures 34, stop means may be externally provided to engage the same, either engaging the same directly or indirectly. A pair of stops 44 are shown in FIGURE 1 which are alternatively engageable with the housing 41 of the actuator 40 for such purpose. It is evident that either stop 44 may be so disposed as to obtain a partial or full throttling of the apertures 34 by the housing 20. At any event, the fluid coupling 11 is versatile in this regard and any number of selectively disposed and positioned stops 44 may similarly be employed to limit travel in either direction.

Pressure fluid enters the fluid coupling 10 at the threaded end 13 and flows through the inner member 11, thence through the apertures 34 and 28 through the fitting 29 to the fluid device 40. If the fluid device 40 is of the double-acting type, a duplicate fitting would be employed for the other line. Here the same is illustrated as a unit of the spring-return type so that when pressure is relieved, the fluid may reversely flow. If the admission of fluid to the element 40 causes it to move or translate in a direction parallel to the axis of the member 11, the fluid coupling 10 will not materially interfere with such movement. Furthermore, if the element 40 is moved by some other force, whether there is a pressure present in the annular passage 17 or not, the outer member 12 will slide freely on the inner member 11. When there has been relative displacement therebetween from the position illustrated in FIGURE 2, the passages 34 communicate with the annular passage 17 which transmits the pressure fluid to the end thereof adjacent the surface 36 and thus to the fitting 29.

It is thus evident that the extent of such travel may be restricted by mechanical external stops, and that the transmission of fluid flow may be restricted by overlapping of either the housing 20 or the housing 25 with the apertures 34 or by use of a tapered element coacting therewith. The device is ideally suited to either dynamic or static operating conditions and thus comprises a compact arrangement which may be employed with high temperature or high pressure seals for adapting the same to a wide variety of operating conditions and locations.

Although various minor modifications might be suggested by those versed in the art, it should be understood that I wish to embody within the scope of the patent warranted hereon, all such embodiments as reasonably and properly come within the scope of my contribution to the art.

I claim as my invention:

A fluid coupling comprising:
(a) a pair of elongated tubular members of unequal length, the shorter one being disposed slidably around the longer one in radially spaced relation thereto and defining an elongated annular passage therebetween, and each of said members being adapted to be connected into a fluid circuit;
(b) means defining an aperture through the wall of the inner of said members which thus provides a path of fluid communication between the interior of the inner of said members and said annular passage;
(c) tapered tubular means defining an inner wall of the outer of said members and spaced at all times from the inner of said members, said tubular means having an axial extent somewhat greater than the size of said aperture in a direction parallel to said axial extent, and being movable into surrounding relation to the entire area of said aperture, and being further movable in an axial direction while remaining in said surrounding relation to the entire area of said aperture, thereby varying the radial clearance between said members throughout the entire area of said aperture; and
(d) means defining a pair of fluid-tight connections between said members and respectively disposed on opposite sides of said path means.

References Cited by the Examiner
UNITED STATES PATENTS

| | | | |
|---|---|---|---|
| 1,152,127 | 8/15 | Stackpole | 138—45 |
| 1,340,107 | 5/20 | Blache | 251—367 X |
| 2,373,280 | 4/45 | Weber | 285—302 |
| 2,417,249 | 5/47 | Griswold | 285—302 X |
| 2,982,311 | 5/61 | Haskell | 285—302 X |

CARL W. TOMLIN, *Primary Examiner.*